United States Patent Office 3,408,285
Patented Oct. 29, 1968

3,408,285
CATALYSTS PREPARED BY IMPREGNATION OF SILICA-ALUMINA WITH AQUEOUS SOLUTION OF HEXATHIOCYANATO PLATINIC ACID OR AMMONIUM SALT THEREOF
Carl D. Keith, Summit, Kurt W. Cornely, Westfield, and Saul G. Hindin, Mendham, N.J., assignors to Engelhard Industries, Inc.
No Drawing. Filed Mar. 31, 1966, Ser. No. 538,987
9 Claims. (Cl. 208—111)

ABSTRACT OF THE DISCLOSURE

Platinum-promoted, acidic silica-alumina catalysts are prepared by impregnating with an aqueous solution of hexathiocyanato platinic acid, $H_2Pt(SCN)_6$, or the ammonium salt thereof, i.e., ammonium hexathiocyanoplatinate (IV), $(NH_4)_2Pt(SCN)_6$. The resultant catalysts possess excellent activities for hydrocracking of hydrocarbons.

---

This invention relates to improved platinum catalysts and to a method for the preparation of such catalysts. More particularly, it relates to supported platinum catalysts which exhibit superior activity for the hydrocracking of mineral oil hydrocarbons.

Platinum has long been used as a catalytic agent for a variety of conversions, for example hydrogenation, oxidation, isomerization, dehydrogenation and dehydrocyclization, of hydrocarbons. Since platinum is costly and is generally effective in quite small amounts, it is the practice to apply it on the surface of a suitable support or carrier material such as alumina, asbestos, activated carbon, or the like. The usual method for preparing such a catalyst is to impregnate the support material with a solution containing a platinum compound and then dry and calcine the resulting composite. As suitable sources of the platinum, there have been suggested solutions, usually aqueous, of chloroplatinic acid, potassium platinum chloride, potassium platinonitrite, ammonium platinonitrite, ammonium platinum chloride, trimethylbenzyl ammonium platinum chloride, bromoplatinic acid and iodoplatinic acid, the foregoing representing compounds wherein the platinum is present in the anion component, and dinitritodiammino platinum, tetrammino platino chloride and dichloro diammino platinum wherein the platinum is present in the cation component.

The preponderance of supported platinum catalysts, however, are prepared by impregnation with an aqueous solution of chloroplatinic acid, since this method has been found to produce catalysts having consistently high activities for most hydrocarbon conversion reactions. An additional factor promoting its wide use is that chloroplatinic acid is more readily available commercially than the other water-soluble platinum compounds mentioned above.

But the use of chloroplatinic acid, or indeed any of the halogen-containing platinum compounds, has not been entirely satisfactory for platinum-containing catalyst production. An intrinsic difficulty in employing such halogen-containing compounds is that the halide ions released during preparation or operation become sorbed on the catalyst support and are very difficult to remove, resulting in a corrosive effect upon hydrocarbon conversion units, such as hydro-cracking units, over extended periods of operation which may necessitate plant shutdown in order to replace the corroded equipment, as well as on the equipment employed in the catalyst preparation. Thus, it is desired to produce a halogen-free platinum catalyst which would obviate the halide corrosion problem and yet retain a high rate of activity for hydrocarbon conversion processes, especially for catalytic hydrocracking operations.

It has now been found that activities for hydrocracking of hydrocarbons greater than that afforded by chloroplatinic acid-derived catalysts may be obtained by impregnation of an acidic silica-alumina support with an aqueous solution of hexathiocyanato platinic acid,

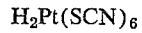

or the ammonium salt thereof, i.e., ammonium hexathiocyanoplatinate (IV), $(NH_4)_2Pt(SCN)_6$. Methods of preparing these platinum compounds are described in copending U.S. patent applications, Serial Nos. 273,559 and 273,582, both filed Apr. 17, 1963, by Hausman et al. The former application discloses an improved method of preparing the ammonium salt of the acid, while the latter application is directed to a method of preparation of the free acid. These platinum compounds differ in their adsorption characteristics on silica-alumina carriers from for example anionic platinum compounds of the prior art. After impregnation of the platinum compounds of this invention on the supports, the composites are suitably dried and, if desired, may be calcined and/or reduced before use. An additional benefit arising from the use of the platinum compounds of this invention is that, since the compounds contain no significant amount of corrosion-promoting halide ions, stainless steel equipment employed in the catalyst preparation and in hydrocracking operations will be useful for longer periods before replacement is necessary.

The carrier for the hydrocracking catalyst of the instant invention is an acidic silica-alumina support. The support component can also contain other materials in addition to silica and alumina which are used in the art as promoters for hydrocracking catalysts, or small amounts of materials such as alkali metals. Examples of the composites contemplated herein include silica-alumina, silica-alumina-zirconia, silica-alumina-thoria, silica-alumina-magnesia and the like. The silica-alumina may be amorphous or a crystalline material such as a crystalline alumino silicate. The support is often a synthetic composite of silica and alumina and generally the supports, whether natural or synthetic, contain between about 10 and 60 percent, preferably 15–45%, by weight of alumina. Especially useful silica-alumina supports are, for example, those containing about 1% to 100% of a faujasite type molecular sieve with uniform pores of 8 to 15 A. diameter. Preferably such sieve is between 30% and 90% of the carrier by weight. If the molecular sieve is used with other components, they may be, for example, other crystalline silica-alumina, amorphous silica-alumina or alumina. The crystalline and amorphous forms are as determined by X-ray diffraction analysis. The crystalline alumino silicate, whether synthetic or naturally-occurring, preferably has a pore size of 8–15 A., and most advantageously the pores have a size of 10–14 A. Usually, with a given material, the pores are relatively uniform in size and often the crystalline alumino silicate particles are primarily less than about 15 microns in size, preferably less than about 10 microns. In the crystalline alumino silicate the silica-to-alumina mole ratio may be greater than 3:1 and is usually not above about 12:1, preferably being about 4 to 6:1.

The alumino silicate may be available in the sodium form, for instance with the sodium oxide to alumina mole ratio being about 0.7 to 1.1:1, often about 1:1, but this catalyst poison should preferably not be present in substantial amounts in the catalyst when used in the hydrocracking operation. The sodium or other objectionable ingredients can be removed before or after the crystalline alumino silicate is added to any additional support ingredients. Preferably, however, most, if not essentially all, of the sodium is removed before admixing with amorphous silica-alumina even though in the preparation of the amorphous silica-alumina hydrogel, sodium is normally present and the amount appearing in the combined support from this source may be controlled by water washing. Although sodium may be ion-exchanged from the alumino silicate after its combination with other support ingredients it is usually advantageous to carry out the ion-exchange before such combination.

The impregnation of the support material with a platinum compound of this invention may be carried out in various ways. The carrier, for example, either with or without previous evacuation, may be soaked in either a dilute or concentrated solution, usually aqueous, of ammonium hexathiocyanoplatinate (IV) or hexathiocyanato platinic acid, often in an amount just sufficient to wet the support particles and be completely absorbed. Also, if desired, the solution may be incorporated into the carrier material during the formation of the latter. The platinum compound will be impregnated on the support in catalytic amounts, usually to provide about 0.001 to 5 percent, preferably about 0.3 to 2 percent, by weight of platinum, calculated as the free metal, in the finished catalyst.

After combining the platinum compound with the carrier, the composite can be dehydrated or dried by any suitable procedure in order to remove free solvent, e.g., water. A particularly suitable drying procedure, for example, is the use of a vibrating drying table with an inlet temperature of about 330° F. for a length of time sufficient to reduce the moisture content of the composite to less than about 1 percent by weight, as determined by infrared drying. In general, dehydration or drying is conducted at temperatures ranging from about 200 to 400° F. Either before or after the dehydration, the catalyst can, if desired, be formed into macrosized particles by tabletting or extruding. Generally, these particles are about $\frac{1}{32}''$ to $\frac{1}{2}''$ in diameter and about $\frac{1}{16}''$ to 1" or more in length. Although these macrosized particles are usually formed after dehydration and before calcination, this, of course, is optional and can be done at any time found most convenient. After dehydration, or drying, the composite may be calcined to an active or catalytic state, e.g., at temperatures of about 350 to 550° C. or more, preferably about 400 to 475° C. Advantageously, this is done by contact with a flowing gas stream such as air, nitrogen, etc. In the operation, water of hydration, or combined water, is removed. If desired, the catalyst may also be reduced by supplying a stream of hydrogen. Often the finished catalyst composite will have been sufficiently voided of vaporizable material, by drying and calcining, that the solids content thereof will be about 96 to 97.5 percent, on an ignited weight basis.

Hydrocracking operations are usually performed at temperatures of about 400 to 1000° F., preferably about 500 to 800° F. Hydrocracking temperatures, however, depend to some extent on the nature of the hydrocarbon feed and the upgrading processes, if any, to which the feed has been previously subjected. A prior hydrorefining step reducing sulfur and nitrogen impurities in the feedstock will, for example, generally permit the use of lower hydrocracking temperatures. Also, lower temperature ranges will often be used in conjunction with relatively high boiling feedstocks, for example, those having end-points above about 750° F. Other conditions of hydrocracking may often include a pressure of about 100 to 10,000 pounds per square inch gauge, preferably 200 to 3,000 p.s.i.g.; a liquid hourly space velocity (LHSV) of about 0.1 to 10, preferably 0.25 to 5; and a ratio of molecular hydrogen to hydrocarbon feed of about 500 to 15,000 standard cubic feet per barrel (s.c.f./b.), preferably 1,000 to 10,000.

The hydrocarbon feedstocks which may be hydrocracked using the catalyst of the present invention with particular advantage include in general any mineral oil fraction having an initial boiling point above the conventional gasoline range, i.e., above about 400° F., and often having an end boiling point below about 1000° F. This includes straight-run gas oils, coker gas oils, cycle stocks derived from catalytic or thermal cracking operations, deasphalted crude oils and the like. Especially suitable are distillate oils, particularly the gas oils. A batch, semi-continuous or continuous hydrocracking system may be employed, but most often a continuous system is used.

The following examples illustrate the preparation of silica-alumina supported platinum catalysts, in accordance with the method of the present invention and, for comparison purposes, in accordance with prior art procedures. The parts and percentages given are by weight and are based on total solids content, i.e., they are computed from an ignited weight basis.

EXAMPLE I

A silica-alumina support was prepared as follows: A mixture of 85 parts of an amorphous silica-alumina hydrogel (containing about 12 to 15 percent alumina) and 15 parts of an ammonium ion-exchanged crystalline alumino silica (having a molar ratio of silica to alumina of about 5:1 and uniform pores of about 13 A. size) was dried to 90 percent solids (ignited weight basis). To 88 parts of this dried mixture was added 10 parts of a substantially boehmite alumina (containing 23 percent of an amorphous hydrous alumina and 77 percent of a boehmite alumina of 18 A. crystallite size) and 2 parts of a commercially supplied, non-ionic cellulose ether, to serve as a binder. The final composite was extruded into pellets. The extrudate was dried on a vibrating table dryer to a moisture content of less than 1.0% by weight as determined by infrared drying. The dried material was then calcined at 500° C., at a VHSV of 800 (volume of air per volume of catalyst per hour), for a period of two hours.

One hundred grams of this material were placed in a 500 ml. filter flask with the side arm attached to a vacuum pump, and the mouth of the flask fitted with a dropping funnel containing an aqueous solution of $(NH_4)_2Pt(SCN)_6$. The impregnating solution was slowly admitted to the evacuated filter flask while the flask was actively shaken. Sufficient impregnating solution was thus absorbed by the crystalline alumino silicate-containing carrier to provide 0.5 weight percent of platinum in the finished catalyst. The impregnated support was then allowed to stand at room temperature for 2 hours, after which it was dried under infrared on a rotating table for 2 more hours, still further dried at 110° C. overnight and, finally, calcined in air at an air flow rate of 1000 VHSV (volume of air per volume of catalyst per hour) for 2 hours at 450° C. The catalyst of this example was designated J–114.

EXAMPLE II

The catalyst of this example was prepared in a manner identical to, and using the same support material as, that of Example I except that an aqueous solution of chloroplatinic acid, $H_2PtCl_6$, was used as the platinum source and the impregnated support was dried at 110° C. for 1 hour only, instead of overnight. The finished catalyst, designated J–72, likewise contained 0.5 percent platinum.

Comparison tests of the hydrocracking activities of the two catalysts were run on a petroleum hydrocarbon distillate having the following characteristics:

A.P.I. gravity _____ 34.8
Distillation, ° F.:
    I.B.P. _____ 534
    20% _____ 525
    50% _____ 593
    80% _____ 615

Distillation, °F.;
 E.P. _____ 654
Contents, weight percent:
 Sulfur _____ 0.31
 Nitrogen _____p.p.m__ 107
 Aromatics _____ 20
Aniline point _____ 72.6

The tests were run at 1 WHSV, i.e., weight of feed per weight of catalyst per hour, with once-through hydrogen at a pressure of 1000 p.s.i.g. The conversion conditions included a start-up temperature of 550° F. which was increased by successive steps until the conversion leveled out, following which the temperature was held constant for the remaining part of the 70–80 hour run.

In each run the percent conversion of the hydrocarbon feed effected by the test catalyst (referring to the weight percent of the feed converted to hydrocarbons boiling below 400° F.) was compared with the percent conversion effected by a standard hydrocracking catalyst containing 0.5 weight percent of platinum on silica-alumina. By assigning an activity value of 0.7 to the percent conversion effected by the standard catalyst, a basis was established for determining the "relative activities" of the test catalysts.

Employing the above test, the catalyst of Example I exhibited a relative activity of 4.5, as compared with a relative activity of 3.4 for the catalyst of Example II; thus the relative hydrocracking activity of the catalyst prepared by impregnation with ammonium hexathiocyanoplatinate (IV) was increased by 1.1 over that of the chloroplatinic acid-impregnated catalyst.

The following examples reveal a further favorable comparison of the hydrocracking activity of catalysts prepared by the method of the present invention as compared to those of catalysts prepared by chloroplatinic acid impregnation. The support material was again a silica-alumina composite but, as indicated, contained no crystalline alumino silicate. Relative activities were determined as in Examples I and II.

EXAMPLE III

To 90 parts of a dried amorphous silica-alumina, containing 12.5 percent alumina, was added 10 parts of a substantially boehmite alumina, containing 23 percent of an amorphous hydrous alumina and 77 percent of a boehmite alumina of 18 A. crystallite size. The resulting mixture was extruded into pellets. The extrudate was dried on a vibrating table dryer to a moisture content of less than 1.0% by weight as determined by infrared drying. The dried material was then calcined at 500° C., at a VHSV of 800 (volume of air per volume of catalyst per hour), for a period of two hours. A portion of this material was impregnated with an aqueous solution of ammonium hexathiocyanoplatinate (IV) as in Example I. The finished catalyst, designated J–120, contained 0.5 weight percent of platinum. When subjected to the previously described hydrocracking test it exhibited a relative activity of 1.0.

EXAMPLE IV

Another portion of the extruded pellets of Example III was impregnated with an aqueous solution of chloroplatinic acid using the same technique as in Example I. An additional 0.5 weight percent of chloride ion was added as HCl. The resultant catalyst, designated J–70, exhibited a relative activity of 0.7 when subjected to the above hydrocracking test.

Thus, it is evident from the foregoing examples that silica-alumina supported platinum catalysts prepared by the method of this invention provide generally high hydrocracking activities, especially as compared to those of chloroplatinic acid-derived catalysts. Besides exhibiting high hydrocracking activities, these novelly prepared, halogen-free catalysts have the advantage over prior platinum catalysts of being substantially less corrosive to the equipment used in the catalyst preparation and to the stainless steel conversion units, even after long periods of operation.

It is claimed:

1. In a method for the preparation of an acidic silica-alumina supported, platinum-containing catalyst, the improvement wherein the acidic silica-alumina support is impregnated with an aqueous solution of ammonium hexathiocyanoplatinate (IV).

2. The method of claim 1 wherein the acidic silica-alumina support contains crystalline alumino silicate having a pore size in the range of 8–15 A.

3. The method of claim 2 wherein the acidic silica-alumina support consists essentially of about 30 to 90 weight percent of a crystalline alumino silicate having a pore size in the range of 10–14 A. and a silica to alumina mole ratio of about 4 to 6:1.

4. An acidic silica-alumina supported, platinum-containing catalyst prepared by the method of claim 1 containing about 0.001 to 5 percent by weight of platinum, calculated as the free metal.

5. An acidic silica-alumina supported, platinum-containing catalyst prepared by the method of claim 2 containing about 0.001 to 5 percent by weight of platinum, calculated as the free metal.

6. An acidic silica-alumina supported, platinum-containing catalyst prepared by the method of claim 3 containing about 0.001 to 5 percent by weight of platinum, calculated as the free metal.

7. A process of hydrocracking a mineral hydrocarbon distillate boiling above the gasoline range which consists essentially of contacting the distillate with molecular hydrogen under hydrocracking conditions, including a temperature of about 400 to 1000° F., in the presence of the silica-alumina supported, platinum-containing catalyst of claim 4.

8. A process of hydrocracking a mineral hydrocarbon distillate boiling above the gasoline range which consists essentially of contacting the distillate with molecular hydrogen under hydrocracking conditions, including a temperature of about 400 to 1000° F., in the presence of the silica-alumina supported, platinum-containing catalyst of claim 5.

9. A process of hydrocracking a mineral hydrocarbon distillate boiling above the gasoline range which consists essentially of contacting the distillate with molecular hydrogen under hydrocracking conditions, including a temperature of about 400 to 1000° F., in the presence of the silica-alumina supported, platinum-containing catalyst of claim 6.

References Cited

UNITED STATES PATENTS

| | | | |
|---|---|---|---|
| 3,140,253 | 7/1964 | Plank et al. | 208—120 |
| 3,236,761 | 2/1966 | Rabo et al. | 208—111 |

OTHER REFERENCES

Gmelin: "Handbuch Der Anorganishen Chemic," Aufl 8, System No. 68C., 1939, pp. 127–128.

DELBERT E. GANTZ, *Primary Examiner.*

A. RIMENS, *Assistant Examiner.*